United States Patent
Kabasawa et al.

(10) Patent No.: US 7,493,479 B2
(45) Date of Patent: Feb. 17, 2009

(54) METHOD AND APPARATUS FOR EVENT DETECTION FOR MULTIPLE INSTRUCTION-SET PROCESSOR

(75) Inventors: Masayuki Kabasawa, Kokubunji (JP); Naohiko Irie, Kokubunji (JP); Takahiro Irita, Higashimurayama (JP); Tetsuya Yamada, Kodaira (JP); Takanobu Tsunoda, Kokubunji (JP)

(73) Assignee: Renesas Technology Corp., Tokyo (JP)

( * ) Notice: Subject to any disclaimer, the term of this patent is extended or adjusted under 35 U.S.C. 154(b) by 979 days.

(21) Appl. No.: 10/458,289

(22) Filed: Jun. 11, 2003

(65) Prior Publication Data

US 2004/0049658 A1    Mar. 11, 2004

(30) Foreign Application Priority Data

Sep. 5, 2002   (JP)   ............... P2002-259525

(51) Int. Cl.
G06F 9/30 (2006.01)
G06F 9/40 (2006.01)
G06F 15/00 (2006.01)
G06F 7/38 (2006.01)

(52) U.S. Cl. ................ 712/233; 712/209
(58) Field of Classification Search ........... 712/209, 712/233

See application file for complete search history.

(56) References Cited

U.S. PATENT DOCUMENTS

| | | | | |
|---|---|---|---|---|
| 6,308,319 B1* | 10/2001 | Bush et al. | ............ | 717/141 |
| 6,317,872 B1* | 11/2001 | Gee et al. | ............ | 717/152 |
| 6,349,377 B1* | 2/2002 | Lindwer | ............ | 712/22 |
| 6,374,286 B1* | 4/2002 | Gee et al. | ............ | 718/108 |
| 6,886,094 B1* | 4/2005 | Blandy | ............ | 712/244 |
| 2002/0066003 A1* | 5/2002 | Nevill et al. | ............ | 712/209 |
| 2002/0073135 A1* | 6/2002 | Meyer | ............ | 709/107 |
| 2003/0135716 A1* | 7/2003 | Vinitzky | ............ | 712/220 |

FOREIGN PATENT DOCUMENTS

WO       WO 02/29563 A1     6/2001

OTHER PUBLICATIONS

NSIcom, Ltd.; Technical Note: The JSCP Thread Model; 1999; NSIcom, Ltd.*

Smith et al.; Implementing Precise Interrupts in Pipelined Processors; 1988; IEEE; pp. 562-573.*

Agesen et al.; Garbage Collection and Local Variable Type-Precision and Liveness in Java Virtual Machines; Jun. 1998; ACM Press; CPLDI '98; pp. 1-11.*

(Continued)

Primary Examiner—Eddie P Chan
Assistant Examiner—Corey S Faherty
(74) Attorney, Agent, or Firm—Reed Smith LLP; Juan Carlos A. Marquez, Esq.

(57) ABSTRACT

A method and apparatus are provided for event detection for a multiple instruction-set processor. In one example of the apparatus, a data processing device comprises an instruction execution device configured to execute a first instruction set as specific instructions; an instruction conversion circuit configured to convert instructions of a second instruction set into a first instruction string of the first instruction set, and further configured to supply the first instruction string to the instruction execution device; and a counter device configured to count a prescribed event, wherein the instruction conversion circuit is further configured to output a prescribed instruction when the counter device is satisfied by a prescribed condition.

22 Claims, 10 Drawing Sheets

OTHER PUBLICATIONS

Markus Levy, "Java to Go: Part 1, Accelerators Process Byte Codes for Portable and Embedded Applications", Cahners Microprocessor Report, Microdesign Resources, Feb. 12, 2001, along with Japanese translation of the article by Nikkei Electronics, pp. 1-4.

Markus Levy, "Java to Go: The Finale, Selecting the Best Brew" Cahners Microprocessor Report, Microdesign Resources, Jun. 4, 2001, pp. 1-7.

JPO Office Action dated Jan. 5, 2008, in Japanese.

* cited by examiner

| ifeq | TST R0<br>BT {#operand1, #operand2} | ;T=(R0==0) |
|---|---|---|
| ifne | TST R0<br>BF {#operand1, #operand2} | ;T=(R0==0) |
| iflt | CMP #0, R0<br>BT {#operand1, #operand2} | ;T=(0≦R0) |
| ifne | CMP #0, R0<br>BF {#operand1, #operand2} | ;T=(0≦R0) |
| if_icmplt | CMP #0, R0<br>BT {#operand1, #operand2} | ;T=(R1≦R0) |
| if_icmpge | CMP #0, R0<br>BF {#operand1, #operand2} | ;T=(R1≦R0) |
| ... | ... | |

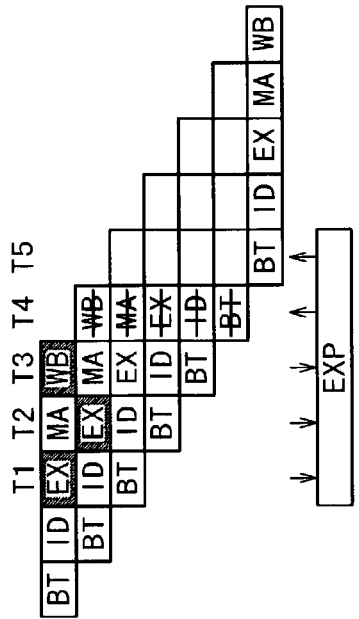

FIG. 8A baload(instruction set only)

R1:pointer, R0:index, R5:temp(length), R6:exception address

```
00: MOV.L   @(#offset1+R1),R5   ;length
01: TST     R1,R1
02: JMPT    @R6                 ;length
03: CMP     #0,R0
04: JMPT    @R6                 ;0≦index
05: CMP     R5,R0
06: JMPT    @R6                 ;length≦index
07: ADD     R0,R1
08: MOV.B   @(#offset2+R1),R1
```

FIG. 8B baload(with hardware)

R1:pointer, R0:index, R5:temp(length)

```
00: MOV.L   @(#offset1+R1),R5   ;pointer, length
01: LDC     R0,BT
02: ADD     R0,R1               ;index
03: MOV.B   @(#offset2+R1),R1
04; (next code 1)
05; (next code 2)
06; (exception sequence)
```

00; MOV.L @(#offset1,R1),R5
01; LDC R0,BT
02; ADD R0,R1
03; MOV.B @(#offset2,R1),R1
04; NEXT_CODE1
05; NEXT_CODE2
06; EXCEPTION1 idiv(R1/R0)
R0:stack, R1:second stack, R5, R6:tmp

```
00; LDC    R0, BT
01; LDC    R1, BT
02; MOV    #0, R6
03; CMP    R1, R6
04; SUBC   R5, R5
04; SUBC   R1, R1
05; SHLL16 R0
```

↑ 32bit sequence
↓ 16bit sequence

METHOD AND APPARATUS FOR EVENT DETECTION FOR MULTIPLE INSTRUCTION-SET PROCESSOR

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to multiple instruction set processors and, more particularly, to techniques for detecting specific events and to techniques for processing the specific events in an event detection mechanism for a multiple instruction-set processor.

2. Discussion of Background

Applications coded in the Java language have increasingly been used in cellular phones and personal digital assistants. Java is an object-oriented programming language similar to C++, developed by Sun Microsystems, Inc. "Java" is a registered trademark of Sun Microsystems, Inc. A factor of acceptance of the Java language is that the Java language has such characteristics that the intermediate language is converted into instructions specific to the central processing unit (CPU) using a virtual machine (VM) for execution. Portability is high because any CPU having a virtual machine allows Java applications to be executed regardless of the kind of the CPU. The intermediate language, which refers to results of compiling for producing Java execution objects, is also referred to as Java bytecodes or simply as bytecodes.

A virtual machine (VM) is typically in the form of software, in other words, a software VM. Since bytecodes are interpreted and executed by an interpreter, processing is generally slow. For this reason, a hardware accelerator is used to execute frequently used bytecodes by hardware and thereby achieve high speed processing. An example of the hardware accelerator is described in "Nikkei Electronics, No. 797, pp. 168-176, 2001. 6. 4 (this article is the translation of "Java to go: Device 1; Microprocessor Report, vol 15, no. 2, Feb. 2001").

An aspect of Java involves thread switching during processing of bytecodes by a hardware accelerator. The specifications of VM are decided by Sun Microsystems, Inc. Sun Microsystems, Inc. discloses plural specifications as "Java2." Of these specifications, specifications for built-in equipment are "J2ME." The specifications further have two specifications, CDC for network information equipment and CLDC for portable network information equipment limited in CPU and memory.

Generally, an OS executing plural normal tasks uses timer interrupts to detect the timing of switching between the tasks. Java also executes plural tasks in parallel. In Java, the above-described tasks are referred to as threads. Thread switching in reference implementation of CDC shown by Sun Microsystems, Inc. is also made by timer interrupts. On the other hand, in reference implementation of CLDC, to implement thread switching more easily, the number of executed bytecodes is counted, and thread switching is made when it reaches a given value.

FIG. 2 shows a conceptual diagram of the thread switching. Three threads, A(TH_A), B(TH_B), and C(TH_C), are executed, and TH_A1 in TH_A is first executed. When the number of bytecodes executed in TH_A1 reaches a given value, VM switches the thread to be executed to TH_B1. When the number of bytecodes executed in TH_B1 reaches a given value, switching is made to TH_C1, and then to TH_A2.

Conventionally, the counter decrementing and underflow checking have been performed by software. For example, a count number is mapped onto a general register of a CPU and a counter is decremented by an instruction specific to the CPU. In this case, an instruction to decrement a count and a conditional branch instruction for task switching are executed for each bytecode. Unfortunately, such a technique would increase the number of execution instructions and high speed operations would become more difficult in comparison with timer interrupts by normal hardware.

VM specifications similar to thread switching include garbage collection. VM has memory areas used at random, and disused areas remain discontinuously in the memory areas as the execution of Java programs proceeds. Accordingly, VM makes memory reorganization called garbage collection. The timing of checking whether to make garbage collection depends on VM. In CDC reference implementation shown by Sun Microsystems, Inc., the number of backward branches is counted, and when the counter underflows, whether to make garbage collection is checked. Also in this case, the counter decrementing and underflow checking were performed by software, and as in the thread switching, the number of execution instructions increases and high speed operations became difficult.

Another specification of Java includes Java exceptions. Java has processing called Java exceptions specific to Java. Each time a program attempts to access data on an array structure, Java checks to see that a pointer to the array is not null, and the index to access is not out of bounds. Java generates null pointer exception if the pointer is null, and array index out of bounds exception if the index is out of bounds, and causes a branch to an exception handling routine. Other Java exceptions include arithmetic exception generated when a division by 0 is attempted. Each time an array is accessed, it is necessary to check that the pointer is not null, and that the index to access is not out of bounds. An attempt to perform such checking by software increases the number of execution instructions, making high speed operations difficult.

SUMMARY OF THE INVENTION

Broadly speaking, the present invention fills needs of the art by providing a method and an apparatus for event detection for a multiple instruction-set processor. It should be appreciated that the present invention can be implemented in numerous ways, including as a process, an apparatus, a system, a device or a method. Several inventive embodiments of the present invention are described below.

An object of the present invention is to provide an event detection mechanism for multiple instruction-set processor having a module for correctly and rapidly counting the number of execution bytecodes or the number of backward branches as described above by hardware in a hardware accelerator.

Accordingly, another object of the present invention is to provide a module for rapidly detecting Java exceptions in an event detection mechanism for multiple instruction-set processor that converts bytecodes into instructions specific to a CPU by a hardware accelerator.

The above-described techniques can reduce the number of CPU instructions in counting the number of bytecodes and the number of CPU instructions for detecting Java exceptions, enabling high speed operations.

An event detection mechanism for multiple instruction-set processor comprises an instruction execution device for executing a first instruction set as specific instructions, an instruction conversion circuit for converting instructions of a second instruction set into a first instruction string of the first instruction set and supplying it to the instruction execution device, and a counter device for counting prescribed events, wherein the instruction conversion circuit outputs prescribed instructions when the counter satisfies prescribed conditions.

The instruction execution device may be of pipeline type having plural stages, and a simulated pipeline having plural simulated stages corresponding to the plural stages is provided.

A module is provided that, when the counter satisfies the prescribed conditions, nullifies succeeding instructions remaining on a pipeline of the instruction execution device.

The invention encompasses other embodiments of a method, an apparatus, a system, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

FIG. 8A is a diagram showing a baload bytecode for detecting Java exceptions by CPU instructions only;

FIG. 8B is a diagram showing a CPU instruction string in a case where a hardware accelerator is used;

DESCRIPTION OF THE PREFERRED EMBODIMENTS

An invention for a method and apparatus for event detection for a multiple instruction-set processor is disclosed. Numerous specific details are set forth in order to provide a thorough understanding of the present invention. It will be understood, however, to one skilled in the art, that the present invention may be practiced with other specific details.

Though there is no particular limitation, circuit elements constituting blocks of the embodiments may be formed on one semiconductor substrate such as a single-crystal silicon by semiconductor integrated circuit technology such as known CMOS transistors (complementary MOS transistors) and bipolar transistors. A circuit element or a group of elements may be referred to as a device. The term "device" as used in the present invention means hardware, software, or combination thereof.

Figure 1:
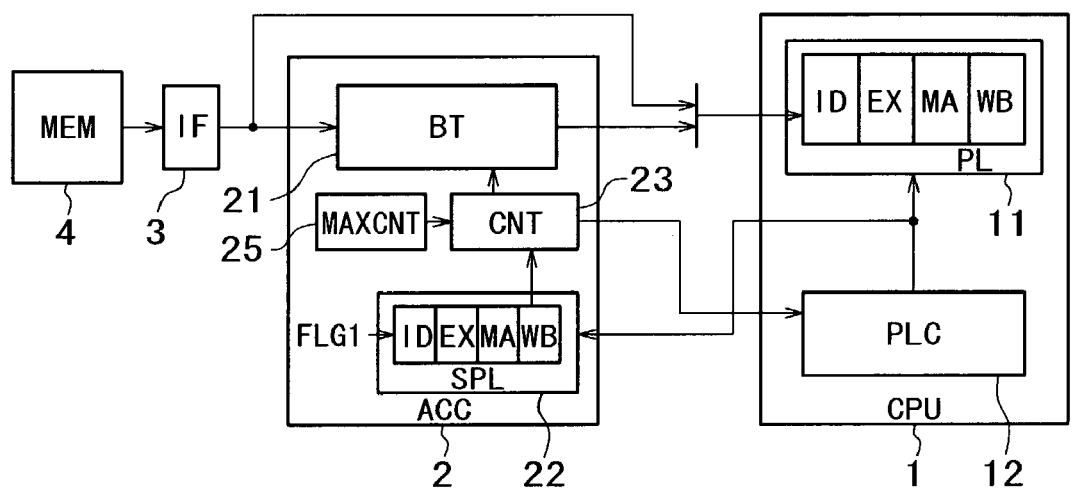
FIG. 1 is a diagram schematically illustrating an event detection mechanism for multiple instruction-set processor of the present invention.
Figure 2:
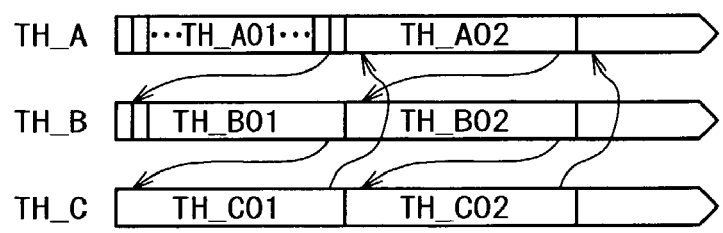
FIG. 2 is a diagram schematically illustrating Java thread switching.

FIG. 1 shows a first embodiment of the event detection mechanism of the present invention. The embodiment is an embodiment of the event detection mechanism that rapidly switches threads. In FIG. 1, an instruction fetch device (IF), an instruction conversion device (ACC) 2 (hereinafter referred to as an accelerator), and an instruction execution device (CPU) 1 (hereinafter referred to as CPU) are shown by different blocks. These blocks are not necessarily clearly differentiated; all of the blocks may be referred to as a CPU, or in some cases, several of them may be collectively referred to as a CPU. In FIG. 1, like common processors, CPU 1 has an instruction set (hereinafter referred to as a CPU instruction set), which is a collection of processor-specific instructions (hereinafter referred to as CPU instructions) different from Java bytecodes. The CPU 1 of the present embodiment performs pipeline processing. Though there is no particular limitation, a pipeline (PL) 11 has an instruction decode stage (ID stage) (ID), instruction execution stage (EX stage) (EX), memory access stage (MA stage) (MA), and writeback stage (WB stage) (WB). The pipeline (PL) 11 is subjected to control such as the stall of the pipeline (PL) 11 and cancellation of succeeding instructions at branch time by the pipeline control device (PLC) 12.

A memory (MEM) 4 holds information for executing Java such as Java bytecodes, software VM, and frames. Furthermore, the memory (MEM) 4 contains application software coded in other CPU instructions and a work area for software execution. The memory (MEM) 4 may be SRAM such as a cache memory, DRAM used as a main memory, or a memory used as both a cache memory and a main memory, but is not limited to them if it can hold information. The memory (MEM) 4 may be on the same chip as the CPU 1 or may be on a different chip that the CPU 1 is on.

When a normal CPU instruction is supplied from the memory (MEM) 4, it is executed in a route (4→3→11) including the instruction fetch device (IF) 3 and not including the accelerator (ACC) 2. On the other hand, when bytecode is supplied from the memory (MEM) 4, it is inputted to an instruction conversion circuit (BT) 21 within the accelerator (ACC) 2 via the instruction fetch device (IF) 3. The inputted bytecode is converted into one or plural instruction strings (hereinafter referred to as CPU instruction strings) interpretable by the CPU 1 and executed in the CPU 1 (4→3→21→11). The instruction conversion circuit may convert the bytecode into CPU instructions by microcodes or hardwired circuitry. The microcode-based conversion enables flexible accommodation to different types of CPUs having different CPU instruction sets. The hardwired conversion makes a circuit size smaller than the microcode-based conversion.

As described previously, some VM implementations switch threads according to the number of executed bytecodes. In this case, if the accelerator (ACC) counts the number of bytecodes converted by the instruction conversion circuit (BT) 21, it may not match the number of bytecodes actually executed, because of the stall of the pipeline (PL) 11 and pipeline cancellation at branch time. Accordingly, the accelerator (ACC) 2 is provided with a counter (CNT) 23 for counting bytecodes (execution events) executed by the CPU 1. That is, when one bytecode has been executed by the CPU 1, the counter (CNT) 23 decrements a count value by one. When the counter (CNT) 23 underflows, the counter (CNT) 23 conveys the event to the pipeline control device (PLC) of the CPU 1, and the pipeline control device (PLC) cancels (nullifies) succeeding instructions remaining on the pipeline (PL) 11 (23 →12→11). At the same time, the instruction conversion circuit (BT) 21 outputs a prescribed instruction string (an instruction string required to pass processing to software VM). Thread switching is performed by software VM. This configuration makes counting faster than software counting, making it possible for the event detection mechanism to operate fast.

Furthermore, in the present embodiment, a simulated pipeline (SPL) 22 is provided within the accelerator (ACC) 2. The simulated pipeline (SPL) 22 has a "simulated " instruction decode stage (ID) corresponding to the instruction decode stage (ID) of the pipeline (PL) 11, a simulated instruction execution stage (EX) corresponding to the instruction execution stage (EX), a simulated memory access stage (MA) corresponding to the memory access stage (MA), and a simulated writeback stage (WD) corresponding to the writeback stage (WB). The simulated pipeline (SPL) 22 is controlled using signals with which the pipeline control device (PLC) 12 controls the pipeline (PL) 11. In other words, the simulated pipeline (SPL) 22 performs the same pipeline operations as the pipeline (PL) 11. To the simulated pipeline (SPL) 22, a flag (FLG1) synchronous with a last CPU instruction of a CPU instruction string developed from bytecodes is inputted. When FLG1 arrives in the simulated writeback stage (WB) of the simulated pipeline (SPL) 22, the counter (CNT) 23 decrements a count value by one. By thus providing the simulated pipeline (SPL) 22 having plural simulated stages corresponding to plural stages of the pipeline (PL) 11, the number of executed bytecodes can be correctly counted.

Furthermore, in the present embodiment, a counter maximum value register (MAXCNT) 25 is provided. The counter maximum value register (MAXCNT) 25 is a register for specifying an initial value to be written to the counter (CNT) 23 when it underflows. Therefore, the counter (CNT) 23 can be freely set by software such as software VM, and since an initial value is automatically written when the counter (CNT) 23 underflows, high-speed operations can be achieved.

Figures 3, 4:
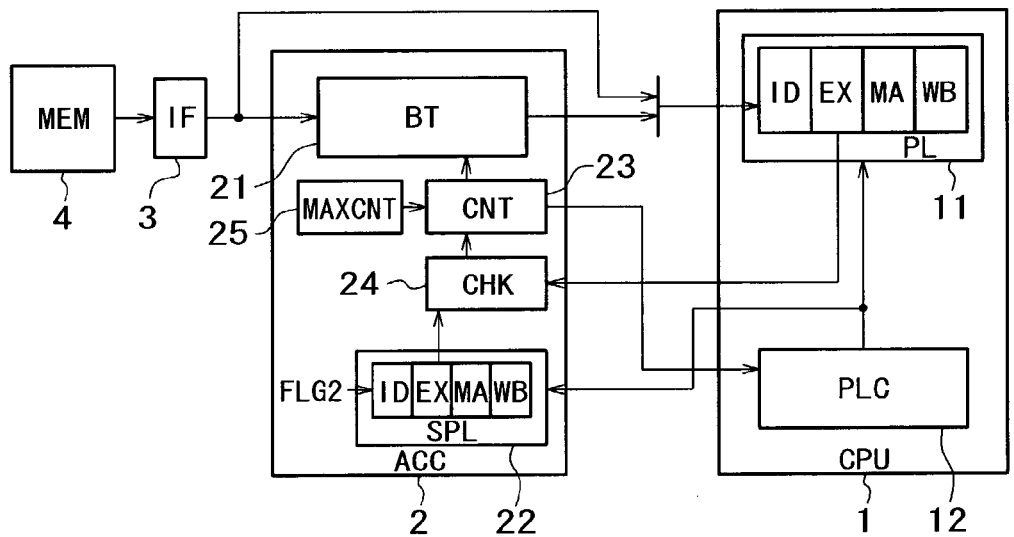
FIG. 3 is a block diagram schematically illustrating an event detection mechanism for multiple instruction-set processor in a second embodiment.
FIG. 4 is a diagram showing examples of conversion of branch bytecodes into CPU instructions.

FIG. 3 shows a second embodiment of the event detection mechanism of the present invention. The second embodiment shows the case of counting backward branches. The present embodiment is the same as the first embodiment in that there is no particular limitation on the demarcation of CPU, and whether a memory and a CPU exist on an identical chip or different chips. Though there is no particular limitation, a branch instruction in a CPU instruction set decides whether to actually cause a branch, by referring to a true/false bit (T bit) set by a preceding instruction.

FIG. 4 shows an example of branch bytecodes and CPU instruction strings outputted by the instruction conversion circuit (BT) 21. TST and CMP instructions perform zero comparison and magnitude comparison, respectively, and change the T bit, depending on whether a true or false condition is satisfied. BT and BF instructions perform branch when the T bit is true and false, respectively, and perform no operation in other cases. The T bit is changed synchronously with the EX stage.

In the second embodiment, when a backward branch is made (backward branch event), the counter (CNT) 23 decrements a count value by one. When the counter (CNT) 23 underflows, as in the first embodiment, succeeding instructions remaining on the pipeline (PL) 11 are canceled in the route of 23→12→11, and the instruction conversion circuit (BT) 21 outputs a prescribed instruction string (an instruction string for passing processing to software VM). A garbage collection check is made by software VM. Thus, high-speed operations of the event detection mechanism can be achieved.

Furthermore, in the event detection mechanism of the second embodiment, as in the first embodiment, the accelerator (ACC) 2 has the simulated pipeline (SPL) 22, and a detecting device (CHK) 24 for determining whether a backward branch is made. The simulated pipeline (SPL) 22 supplies flag information (FLG2) synchronous with BT and BF instructions. The detecting device (CHK) 24 receives flag information from the EX stage of the simulated pipeline (SPL) 22, and receives the T bit from the pipeline (PL) 11 of the CPU 1. The detecting device (CHK) 24 determines that a branch is made if the T bit is true when a BT instruction comes to the EX stage, and if the T bit is false when the BF instruction comes to the EX stage. Upon determining a branch, the detecting device (CHK) 24 reports the event to the counter (CNT) 23, which decrements a counter value by one. With this configuration, the number of backward branches can be correctly counted.

The case of counting execution bytecodes was described in the first embodiment, and the case of counting backward branches was described in the second embodiment. Both of them can be achieved by providing counters CNT 23 corresponding to them. That is, there may be provided a first counter for counting execution bytecodes and a second counter for counting backward branches. In this case, the counter maximum value register (MAXCNT) 25 should be preferably provided for each of them but may be shared between them. Furthermore, the simulated pipeline (SPL) 22 may also be shared between them or may be provided for each of them. When the simulated pipeline (SPL) 22 is shared, information of a last instruction flag (FLG1) after development, and BT and BF flag (FLG2) may be passed to them.

Figure 5:
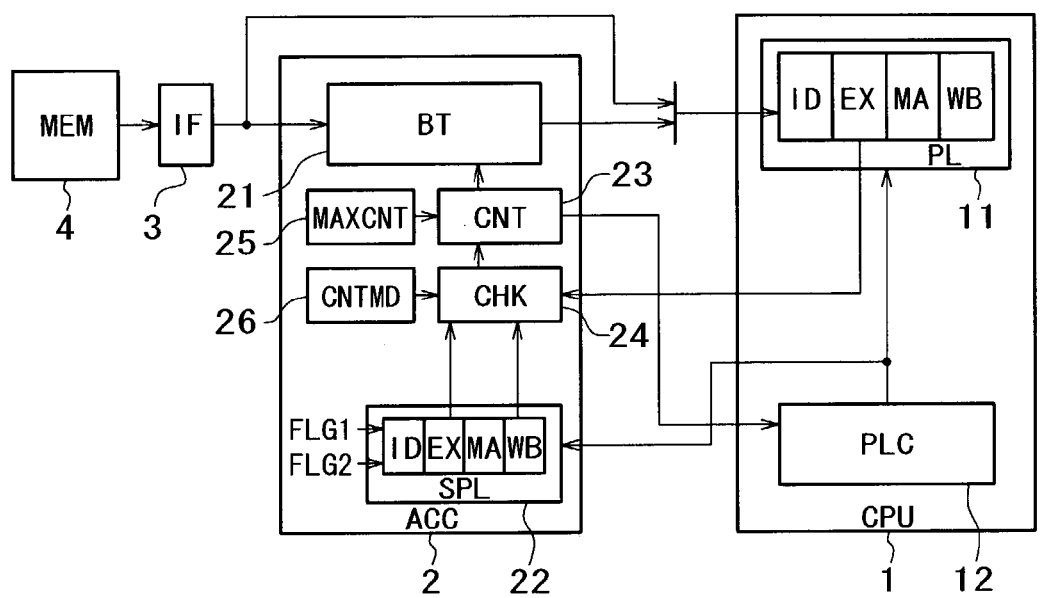
FIG. 5 is a block diagram schematically illustrating an event detection mechanism for multiple instruction-set processor in a third embodiment.

FIG. 5 shows a third embodiment of the event detection mechanism of the present invention. In the third embodiment, it can be selected whether the counter (CNT) 23 counts the number of executed bytecodes or the number of branches. The accelerator (ACC) 2 includes the instruction conversion circuit (BT) 21, simulated pipeline (SPL) 22, detecting device (CHK) 24, counter (CNT) 23, counter maximum value register (MAXCNT) 25, and count mode register (CNTMD) 26.

Figure 6:
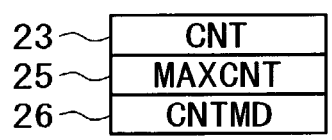
FIG. 6 is a diagram showing a configuration of a setting register on a counter.

FIG. 6 shows registers settable by software such as software VM. The counter maximum value register (MAXCNT) 25, as described above, is a register for specifying an initial value to be written to the counter (CNT) 23 when it underflows. The count mode register (CNTMD) 26 is a register for specifying which of bytecodes and backward branches is to be counted, or that they are not counted.

Information of a last instruction flag (FLG1) after development, and BT and BF flag (FLG2) is passed to the simulated pipeline (SPL) 22. If the count mode register (CNTMD) 26 is specified to count the number of execution bytecodes, the detecting device (CHK) 24 conveys the contents of FLG1 of simulated writeback stage (WB) of the simulated pipeline (SPL) 22 to the counter (CNT) 23. If the count mode register (CNTMD) 26 is specified to count the number of backward branches, as in the second embodiment, the detecting device (CHK) 24 detects that a branch is made, using FLG2 of the EX stage of the simulated pipeline (SPL) 22 and the T bit of the CPU 1, and conveys the event to the counter (CNT) 23. The counter (CNT) 23 decrements a count value. When the counter (CNT) 23 underflows, the pipeline control device 12 cancels the pipeline (PL) 11, and the instruction conversion circuit (BT) 21 outputs an instruction string for passing processing to software VM. At the same time, the value of the counter maximum value register (MAXCNT) 25 is loaded into the counter (CNT) 23. By thus providing the count mode register (CNTMD), it can be freely specified whether the counter (CNT) 23 counts the number of execution bytecodes or the number of backward branches, so that a circuit size can be reduced.

In the first, second, and third embodiments, the configuration of an instruction counting system in the accelerator (ACC) 2 was shown. Although, in the embodiments, detection methods in the writeback stage (WB) and instruction execution stage (EX) were shown, the present invention is not limited to them. What is important in the present invention is that the accelerator (ACC) 2 performs counting at appropriate timing or checks signals of the CPU 1 at appropriate timing to perform counting.

Although the counter (CNT) 22 is configured to decrement a count value by one, the present invention is not limited to this configuration. For example, the count value may be incremented by one. In this case, the counter maximum value register (MAXCNT) may be set to not an initial value but such a count value that the counter (CNT) 22 overflows. What is important for the counter (CNT) 22 in the present invention is that the event detection mechanism is configured so that a specified event (e.g., the number of executed bytecodes, or the number of made backward branches) is counted and a prescribed instruction is outputted from the accelerator (ACC) 2 when a given condition is satisfied (e.g., underflow). The counter (CNT) need not be provided in the accelerator (ACC) 2 but may be provided in the CPU 1 or in other locations. Furthermore, the counter maximum value register (MAXCNT) may be set by software without being provided.

Figure 7:
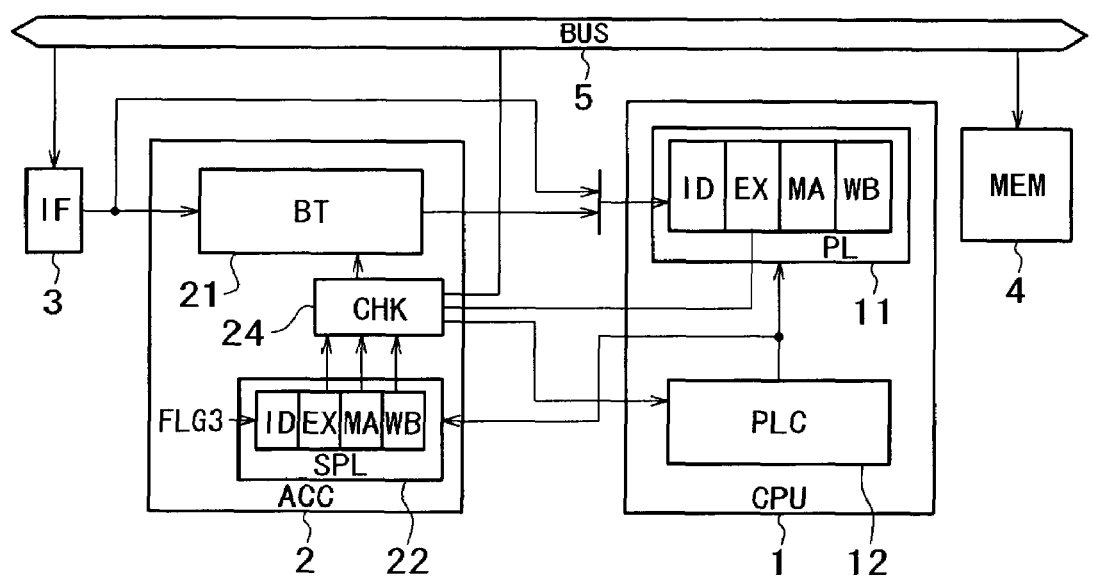
FIG. 7 is a block diagram schematically illustrating an event detection mechanism for multiple instruction-set processor in a fourth embodiment.
Figure 9:
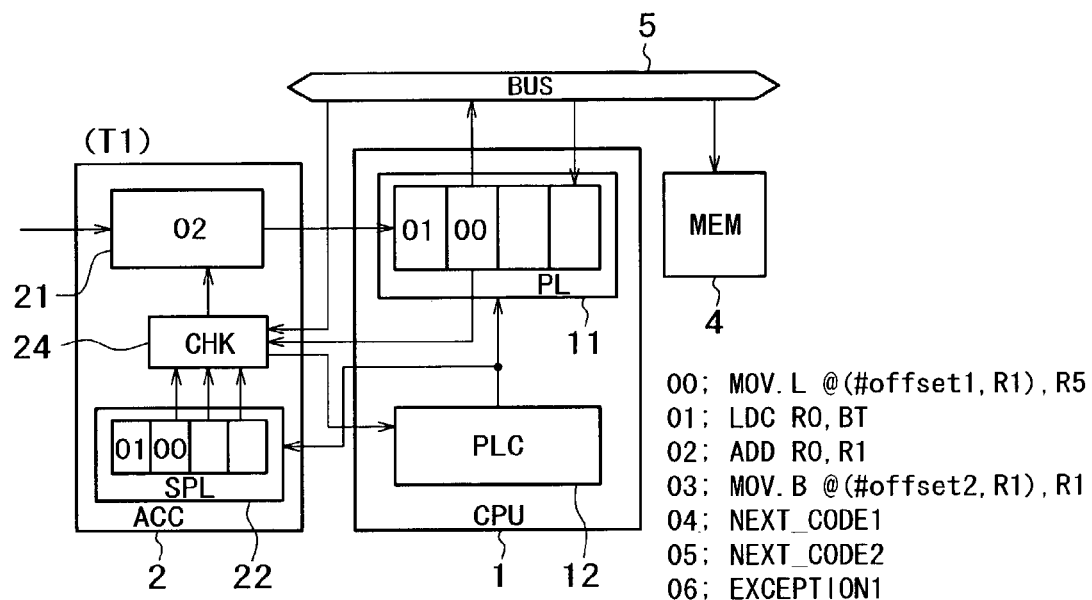
FIG. 9 is a block diagram for illustrating the operation of a baload bytecode.
Figure 10:
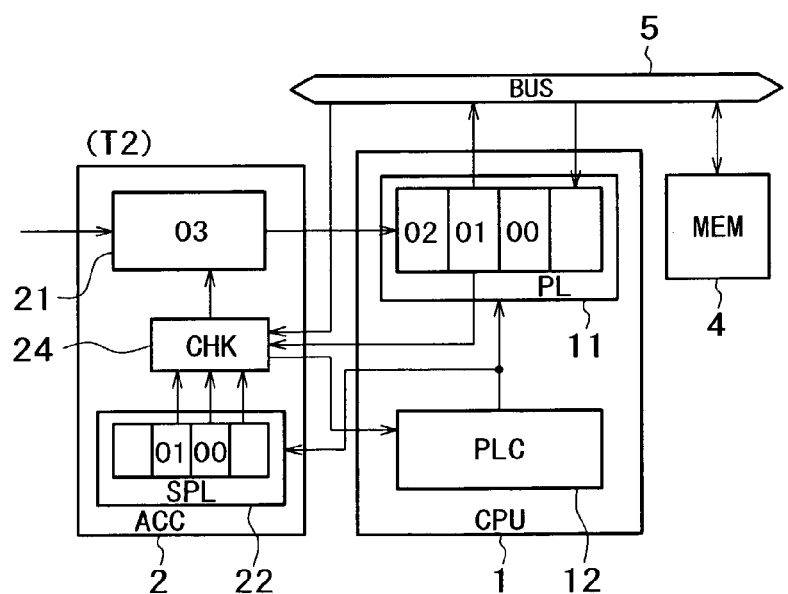
FIG. 10 is a block diagram for illustrating the operation of a baload bytecode.
Figure 11:
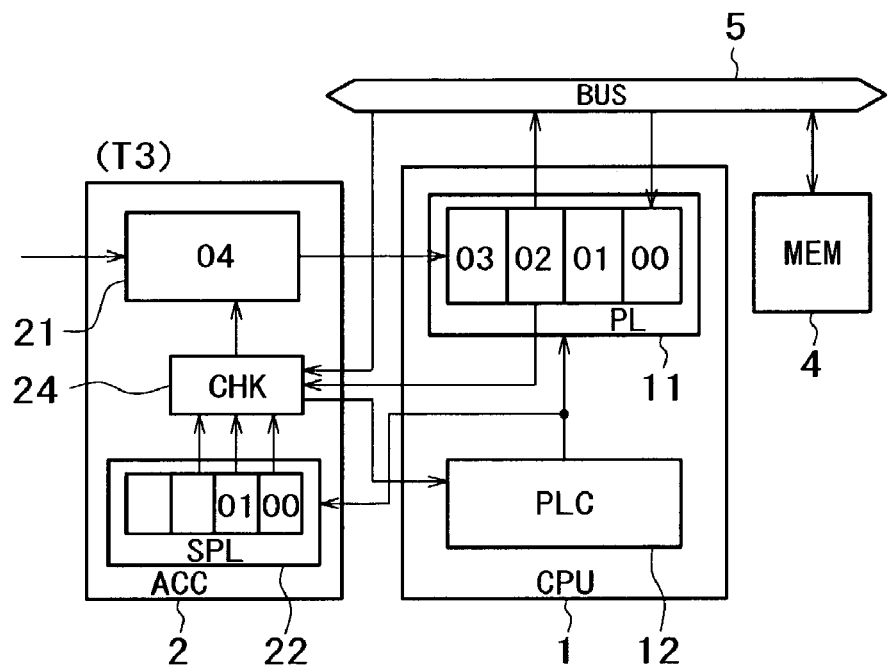
FIG. 11 is a block diagram for illustrating the operation of a baload bytecode.
Figure 12:
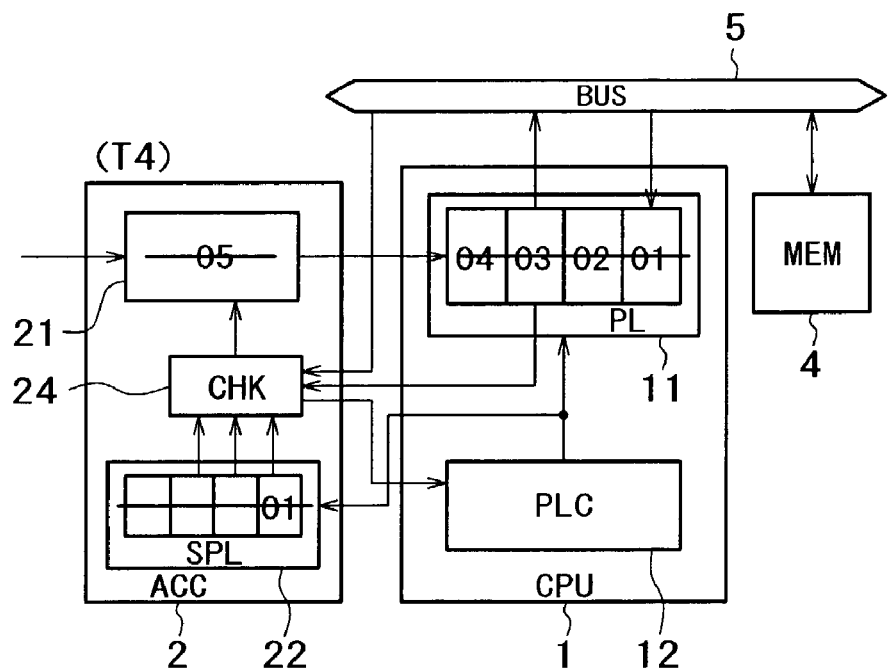
FIG. 12 is a block diagram for illustrating the operation of a baload bytecode.
Figure 13:
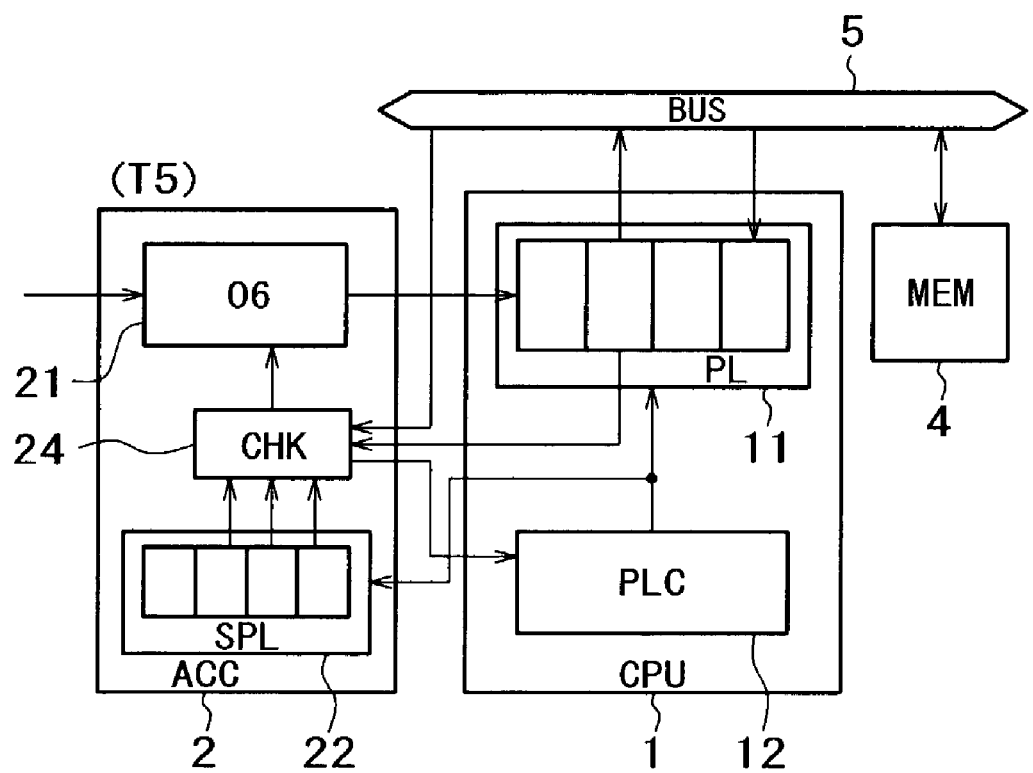
FIG. 13 is a block diagram for illustrating the operation of a baload bytecode.

FIG. 7 shows a fourth embodiment of the present invention. The fourth embodiment detects Java exceptions using the simulated pipeline (SPL) 22. FIG. 7 shows a route through which an instruction fetched from the memory 4 is sent to a fetch device 3 via a bus (BUS) 5. The bus (BUS) is also connected to the detecting device (CHK) 24 and the CPU 1 in the accelerator (ACC) 2. Furthermore, the fourth embodiment is the same as the first to third embodiments, in that the simulated pipeline (SPL) 22 is provided.

The procedure for loading data from a memory of the CPU 1 is described along the flow of operation of the pipeline (PL) 11. An instruction is interpreted in the ID stage. The address to be accessed is calculated in the EX stage and is put on the bus (BUS) 5. In the MA stage, data is being accessed within the memory (MEM) 4 and no special operation is performed on the pipeline (PL) 11. In the WB stage, data of the specified address is conveyed to the CPU 1 through the bus (BUS) 5 and is written to a general register.

Next, the detection of Java exceptions is described using a baload bytecode as an example. The baload bytecode calculates an address from a pointer and index on Java stack, captures one byte of data from an array onto the memory (MEM) 4, and pushes it to the Java stack. To execute baload, a check must be made for Java exceptions before processing of the event detection mechanism is performed. In other words, it must be checked that a pointer to the array is not null, and the index to access is not out of bounds. The former Java exception is null pointer exception, and the latter is array index out Of bounds exception. When Java exception is detected, control is branched to a Java exception handling routine implemented in software VM.

FIG. 8A shows a baload bytecode for detecting Java exceptions by CPU instructions only for comparison with the present invention. It is assumed that the pointer and index of the stack array are mapped into general registers R1 and R0 respectively before execution. The start address of a Java exception handler is R6 and a register for temporary use is R5. Item 00 of FIG. 8A loads an array length into R5 from a pointer (R1) to the array and offset (offset1). Item 01 checks whether the pointer is null. If it is null, in item 02, control is branched to the Java exception handler. Item 03 checks whether the index is positive or negative. If it is zero or fewer, in item 04, control is branched to the Java exception handler. Item 05 checks the magnitude of the index and array length. If prescribed bounds are exceeded, in item 06, control is branched to the Java exception handler. After the above checks terminate, the address of target byte data is calculated in item 07, and the byte data is loaded in item 08. In other words, if the baload bytecode is to be executed by CPU instructions only, seven of the nine instructions are used to detect Java exceptions. offset1 and offset2 in the drawing, which are constants specific to the VM, are inserted in an instruction string outputted by the accelerator (ACC) 2.

An important aspect of the present invention is the array length load instruction of the item 00 in research into ways to speed Java exception detection. If this instruction is executed, the address in which an array length is stored, and the array length are outputted to the bus (BUS) 5. Accordingly, the detecting device (CHK) 24 in the accelerator (ACC) 2 was constructed to monitor the operation of the CPU 1 to detect Java exceptions by capturing the address in which an array length outputted to the bus (BUS) is stored, and the array length. By detecting Java exceptions by hardware in this way, fewer instructions are required, as will be detailed later, than in detecting Java exceptions by CPU instructions only, making it possible for the event detection mechanism to operate fast.

The simulated pipeline (SPL) 22 was used for the monitoring of the operation of the CPU 1 by the detecting device (CHK) 24. That is, the operation of the detecting device (CHK) 24 is controlled according to the position of a flag (FLG3) inputted to the simulated pipeline (SPL) to indicate in which stage of the pipeline (PL) 11 a given instruction is, whereby the timing in which an address and data are outputted to the bus (BUS) 5 can be easily determined.

FIG. 8B shows a CPU instruction string when the hardware accelerator (ACC) 2 is used. Item 00 loads an array length into R5 from an address indicated by the sum of a pointer (R1) to an array and constant offset1. In synchronization with the EX stage of the instruction, the detecting device (CHK) 24 captures an address put on the bus (BUS) 5 (time T1). An array length is outputted to the bus (BUS) 5 from the memory in synchronization with the WB stage of the instruction of item 00 and captured by the detecting device (CHK) 24 (time T3). An LDC instruction of item 01 conveys the value of register into the accelerator (ACC) 2 in synchronization with the EX stage (time T2). Using the three pieces of data, the detecting device (CHK) 24 performs a comparison operation and other operations to detect Java exceptions. If Java exception conditions are satisfied, the detecting device (CHK) 24 directs the pipeline control device (PLC) 12 to cancel the pipeline (PL) 11. Thereafter, it issues an instruction string for passing processing to software. The Java exceptions will be processed by software.

FIGS. 9 to 12 show the detection of Java exceptions of baload along with time. At time T1 (FIG. 9), a flag synchronous with the instruction of item 00 arrives in the EX stage of the simulated pipeline (SPL) 22 of the accelerator (ACC) 2. An address on the bus (BUS) 5 is captured in synchronization with this timing. At time T2 (FIG. 10), a flag synchronous with the instruction of item 01 arrives in the EX stage of the simulated pipeline (SPL) 22. In synchronization with this timing, the detecting device (CHK) 24 captures data outputted by the CPU 1. At time T3 (FIG. 11), a flag synchronous with the instruction of item 00 arrives in the WB stage. At this timing, data on the bus (BUS) 5 is captured. The above-described three pieces of data are subjected to a comparison operation and other operations to determine whether a Java exception occurs. If Java exception is detected, the detecting device (CHK) 24 directs the pipeline control device (PLC) 12 of the CPU 1 to cancel the pipeline (PL) 11 to cancel succeeding instructions (time T4, FIG. 12). From the next cycle, the accelerator (ACC) 2 issues an instruction string (item 06 and succeeding instruction string) for passing processing to software.

Figure 14:
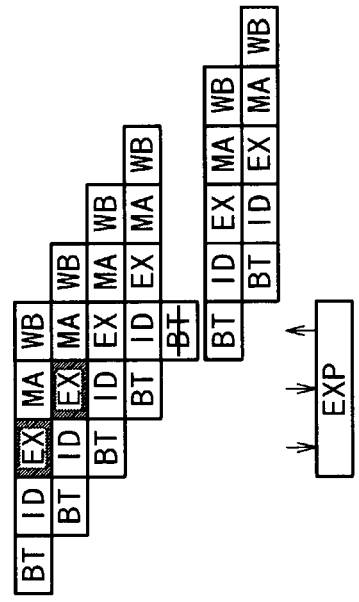
FIG. 14 is a diagram showing an instruction string produced after conversion of an idiv bytecode.

FIG. 14 shows a fifth embodiment of the event detection mechanism of the present invention. The fifth embodiment midway switches a CPU instruction string in idiv bytecode. The idiv instruction is a 32-bit integer division instruction. In FIG. 14, stack top and second stack are mapped into general registers R0 and R1, respectively, and R1÷R0 is calculated. R5 and R6 are general registers allocated for temporary use.

In a CPU instruction set in this embodiment, a division instruction is 1-bit division which is repeatedly executed a required number of times. Therefore, there is a major difference in the number of instructions between 32-bit division and 16bit division. Thus, the instruction conversion circuit (BT) 21 has an instruction string for 32-bit division and an instruction string for 16bit division. The instruction string for 32bit division is first issued and switched to the instruction string for 16bit division at the time when execution of 16bit division is determined. In this case, in the instruction string for 32bit division and the instruction string for 16bit division, portions that can be made common are made common.

The fifth embodiment is described in more detail. A LDC instruction of item 00 of FIG. 14 conveys the value of a general register of the CPU 1 as a divisor to the detecting device (CHK) 24 within the accelerator (ACC) 2 in synchronization with the EX stage. This instruction also checks for zero division. The divisor, if zero, causes arithmetic exception, and processing is passed to software VM in the same way as in the fourth embodiment. Item 01 conveys a dividend to the detecting device (CHK) 24. The timing of capturing the instruction is measured by the simulated pipeline (SPL) 22 within the accelerator (ACC) 2. If the divisor and dividend thus obtained fit within 16bit length, switching is made to the 16bit division instruction string. In this embodiment, the items 00 to 03 are made common in the 32bit instruction string and the 16bit instruction string. Consequently, since only an instruction string in and after item 04 has to be switched and the pipeline control device (PL) 11 is not canceled, higher speed operations can be achieved.

The fourth and fifth embodiments show the detection of Java exceptions and the module for switching instruction strings of idiv bytecode, but are also applicable to other bytecodes. What is important in the present invention lies in the points that the detecting device (CHK) 24 capable of monitoring the operation of the CPU 1 is provided, signals of the CPU 1 are captured in appropriate timing, and output instruction strings of the accelerator (ACC) 2 are switched. Also, timing can be easily taken by controlling the operation of the detecting device (CHK) 24 by the simulated pipeline (SPL) 22. In this case, a module for canceling succeeding instructions on the pipeline (PL) 11 as shown in the fourth embodiment may be provided, or succeeding instructions may not be canceled to achieve high speed operations as shown in the fifth embodiment.

Figure 15:
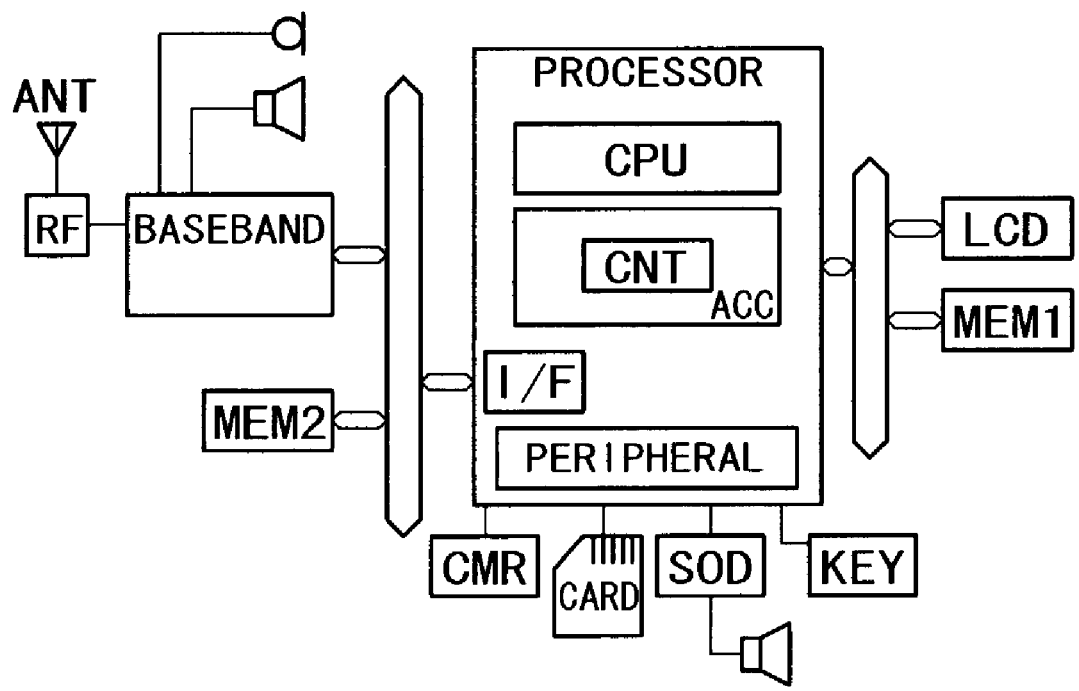
FIG. 15 is a diagram showing the configuration of a portable information system using the present invention.

In the first to third embodiments, the simulated pipeline (SPL) 22 is used to count the number of execution bytecodes and the number of backward branches. In the fourth and fifth embodiments, the simulated pipeline (SPL) 22 is used to detect Java exceptions. However, it is apparent that these embodiments can be achieved by having the simulated pipeline (SPL) 22. In other words, the operation timing of the CPU 1 can be easily recognized by having the simulated pipeline (SPL) 22, and the operation of the accelerator (ACC) 2 in other than the first to fifth embodiments can be easily conformed to the operation timing of the CPU 1. Finally, the configuration of a portable information system as a preferable application example of the present invention is shown in FIG. 15. More specifically, a configuration of a cellular phone is shown. It broadly consists of a communication device and an application device. The communication device comprises an antenna (ANT) for sending and receiving radio waves, a radio-frequency circuit (RF), a baseband modem, a baseband processor (BASEBAND) to perform codec, and a main storage (MEM). The application device has a microprocessor (PROCESSOR) including a bytecode accelerator (ACC) of the embodiment of the present invention and a CPU (CPU). In the microprocessor (PROCESSOR), an application processor and the baseband processor are connected through an interface (I/F), a camera (CMR), a memory card (CARD), a sound source IC (SOD), and keys (KEY) are connected through a peripheral interface (PERIPHERAL), and a liquid crystal display (LCD) and a main storage (MEM1) are connected through an external bus. Although this system configuration example is for cellular phones, various system configuration examples for personal digital assistants, digital cameras, and the like are practicable.

In this system configuration example, the memory is used as described below. Java application is distributed from an external server through the antenna (ANT), and stored in the baseband main storage (MEM2) using the baseband processor (BASEBAND). Software VM may be placed in either of the main storage (MEM1) and the baseband main storage (MEM2). An interpreter device of the software VM is preferably placed in an internal memory because of very frequent access. The present invention enables high speed execution of Java applications by use of the hardware accelerator, providing increased added value for the portable information system.

Although the present invention has been described using Java as an example, without being limited to it, the present invention is applicable to a hardware accelerator for a processor that executes similar intermediate languages and VM-specific instructions by an instruction set.

System and Method Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVD, CD-ROMS, micro-drive, and magneto-optical disks, ROMS, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, executing a first instruction set as specific instructions, converting instructions of a second instruction set into a first instruction string of the first instruction set, counting a prescribed event, and outputting a prescribed instruction when the a prescribed condition is satisfied, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A data processing device for a multiple instruction-set processor, the data processing device comprising:
    an instruction execution device configured to execute a first instruction set as specific instructions and perform pipeline processing with a first pipeline comprising first plural stages; and
    an instruction conversion circuit configured to convert second instructions of a second instruction set into a first instruction string of the first instruction set, and to supply the first instruction string to the instruction execution device, the first instruction string including one or more first instructions,
    wherein the instruction execution device comprises a pipeline control device configured to control a stall of the first pipeline and a cancellation of remaining instructions on the first pipeline at branch time using signals,
    wherein the instruction conversion circuit comprises a counter device and a second pipeline comprising second plural stages and each of the second plural stages corresponds each of the first plural stages,
    wherein the second pipeline is configured to be controlled by the pipeline control device using signals used to control the first pipeline and to perform the same pipeline processing as the pipeline processing of the first pipeline, and
    wherein the counter device decrements a count value when a flag synchronous with one instruction of the first instruction string is inputted into the second pipeline and arrives in one stage of the second plural stages,
    wherein the first plural stages have an instruction decode stage, an instruction execution stage, a memory access stage, and a writeback stage,
    wherein the second plural stages have a simulated instruction decode stage corresponding to the instruction decode stage, a simulated instruction execution stage corresponding to the instruction execution stage, a simulated memory access stage corresponding to the memory access stage, and a simulated writeback stage corresponding to the writeback stage, and
    wherein first hardware includes the first pipeline, second hardware includes the second pipeline, and the first hardware and the second hardware separate from each other.

2. The data processing device of claim 1,
    wherein the counter device is further configured to perform counting in a way that decrements a count value one by one,
    wherein the instruction conversion circuit is further configured to output a prescribed instruction when the count value is in an underflow state, and
    wherein the data processing device further comprises a nullifying module configured to nullify subsequent instructions remaining on the first pipeline of the instruction execution device when the count value is in an underflow state.

3. The data processing device of claim 1,
    wherein the instruction conversion circuit is further configured to output a prescribed instruction when the counter device is satisfied by a prescribed condition, and
    wherein the prescribed instruction is an instruction for passing processing to a software virtual machine to switch threads.

4. The data processing device of claim 3,
    wherein the flag is inputted to the second pipeline when the last instruction of the first instruction string is outputted from the instruction conversion circuit to the instruction execution device,
    wherein the counter device is further configured to count when the flag arrives in the simulated writeback stage.

5. The data processing device of claim 1,
    wherein the counter device includes a first counter device for counting a number of executions of the last instruction of the first instruction string in the instruction execution device, and a second counter device for counting the number of backward branches in the instruction execution device.

6. The data processing device of claim 1,
    wherein the counter device has an execution counter device configured to count at least one of the number of executions of the last instruction of the first instruction string in the instruction execution device and the number of backward branches in the instruction execution device, and
    wherein the data processing device further comprises a register for storing information for controlling whether the counter device counts the number of executions or the number of backward branches.

7. The data processing device of claim 6,
wherein the data processing device further comprises a detecting device configured to determine whether a backward branch is made, and further configured to send a notification to the counter device that a backward branch is made, and
wherein the counter device is configured to decrement a count value by one according to the notification.

8. The data processing device of claim 7,
wherein the flag is inputted to the second pipeline when the last instruction of the first instruction string is outputted from the instruction conversion circuit to the instruction execution device,
wherein a second flag is inputted to the second pipeline when a backward branch instruction contained in the first instruction string is outputted from the instruction conversion circuit to the instruction execution device,
wherein the detecting device is configured to determine whether a backward branch is made when the second flag arrives in the simulated instruction execution stage, and
wherein the counter device is configured to decide based on information stored in the register, whether to perform counting when the first flag arrives in the simulated writeback stage or when the notification is sent.

9. A data processing device for a multiple instruction-set processor, the data processing device comprising:
an instruction execution device having one or more stages configured to execute a first instruction set as specific instructions and perform pipeline processing with a pipeline comprising first plural stages;
an instruction conversion circuit configured to convert instructions of a second instruction set into a first instruction string of the first instruction set, and further configured to supply the first instruction string to the instruction execution device; and one or more simulated stages corresponding to the one or more stages to be synchronized with executions of the first instruction string by the instruction execution device,
wherein the instruction execution device comprises a pipeline control device configured to control a stall of the first pipeline and a cancellation of remaining instructions on the pipeline at branch time using signals,
wherein the instruction conversion circuit comprises a counter device and a simulated pipeline comprising plural simulated stages and each of the plural simulated stages corresponds each of the plural stages,
wherein the simulated pipeline is configured to be controlled by the pipeline control device using signals used to control the first pipeline and to perform the same pipeline processing as the pipeline processing of the first pipeline, and
wherein the counter device decrements a count value when a flag synchronous with one instruction of the first instruction string is inputted into the simulated pipeline and arrives in one stage of the plural simulated stages,
wherein the first plural stages have an instruction decode stage, an instruction execution stage, a memory access stage, and a writeback stage,
wherein the simulated plural stages have a simulated instruction decode stage corresponding to the instruction decode stage, a simulated instruction execution stage corresponding to the instruction execution stage, a simulated memory access stage corresponding to the memory access stage, and a simulated writeback stage corresponding to the writeback stage, and
wherein first hardware includes the first pipeline, second hardware includes the simulated pipeline, and the first hardware and the second hardware separate from each other.

10. The data processing device of claim 9, further comprising a counter device,
wherein the simulated pipeline is configured to receive the flag corresponding to the first instruction string, and
wherein the counter device is further configured to count when the flag arrives in the simulated writeback stage.

11. The data processing device of claim 9, further comprising a counter device,
wherein the simulated pipeline is further configured to receive a flag corresponding to a prescribed instruction of the first instruction string,
wherein the counter device is further configured to count when the flag arrives in the simulated instruction execution stage and when a backward branch occurs in the instruction execution stage.

12. The data processing device according to claim 1, further comprising a counter maximum value register having an initial value,
wherein the counter device is configured to receive the initial value when the counter device underflows.

13. The data processing device according to claim 1, further comprising: a register storing information for controlling the counter device's counting the number of executions or the number of backward branches.

14. The data processing device according to claim 13,
wherein the flag is a first flag or a second flag,
wherein the first flag shows an execution of the last instruction of the first instruction string at a writeback stage of the first pipeline,
wherein the second flag shows that a backward branch of the first instruction string is taken at an execution stage of the first pipeline, and
wherein one of the first flag or the second flag is selected by the register.

15. The data processing device according to claim 14, further comprising: a second register set to the number of executions,
wherein the counter device is decremented by notifying the execution of the last instruction of the first instruction string, and
wherein the instruction conversion circuit finishes processing in order to pass processing to a software virtual machine for switching threads when a count value is in an underflow state.

16. The data processing device according to claim 14, further comprising: a second register set to the number of backward branches,
wherein the counter device is decremented by notifying that the backward branch is taken, and
wherein the instruction conversion circuit finishes the processing in order to pass processing to a software virtual machine for making a garbage collection check when a count value is in an underflow state.

17. The processing device according to claim 1,
wherein the counter device decrements the count value when the flag synchronous with a last first instruction of the first instruction string developed from the second instructions is inputted and the flag arrives in a writeback stage of the second pipeline.

18. The processing device according to claim 17,
wherein the pipeline control device cancels the remaining first instructions on the first pipeline and the instruction conversion circuit outputs a prescribed instruction string to pass processing to software virtual machine and make the software virtual machine perform a thread switch when the counter device underflows.

19. The processing device according to claim 1,
wherein the instruction conversion circuit further comprises a detecting device,
wherein the counter device decrements the count value when the flag synchronous with a branch instruction of the first instruction string when the detecting device detects a backward branch by referring to the flag from a instruction execution stage of the second pipeline and a true/false bit from the first pipeline, and
wherein a branch instruction of the first instruction string decides whether to cause the backward branch by referring to the true/false bit set by a preceding instruction.

20. The processing device according to claim 19,
wherein the pipeline control device cancels the remaining first instructions on the first pipeline and the instruction conversion circuit outputs a prescribed instruction string to pass processing to software virtual machine and make the software virtual machine perform a garbage collection check when the counter device underflows.

21. The data processing device according to claim 1, wherein contents of the first pipeline are different from contents of the second pipeline.

22. The data processing device according to claim 9, wherein contents of the first plural stases are different from contents of the simulated plural stages.

* * * * *